(12) United States Patent
Wang et al.

(10) Patent No.: US 6,336,583 B1
(45) Date of Patent: *Jan. 8, 2002

(54) WELDING PROCESS AND WELDED JOINTS

(75) Inventors: Yung-Shih Wang, Houston; William A. Sorem, Katy, both of TX (US)

(73) Assignee: ExxonMobil Upstream Research Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/513,541

(22) Filed: Feb. 25, 2000

Related U.S. Application Data (60) Provisional application No. 60/125,789, filed on Mar. 23, 1999.

(51) Int. Cl.[7] .......................... B23K 31/02; B23K 35/24
(52) U.S. Cl. ...................... 228/175; 228/225; 228/226
(58) Field of Search ................................. 228/175, 226, 228/225

(56) References Cited

U.S. PATENT DOCUMENTS

| | | | |
|---|---|---|---|
| 2,453,061 A | * | 11/1948 | Bissout et al. |
| 2,812,419 A | | 11/1957 | Chyle ........................ 219/118 |
| 2,963,129 A | | 12/1960 | Eberle ......................... 189/36 |
| 3,745,322 A | | 7/1973 | Ito et al. ...................... 219/137 |
| 4,049,186 A | | 9/1977 | Hanneman et al. ........... 228/225 |
| 4,196,335 A | | 4/1980 | Ikeda et al. ..................... 219/73 |
| 4,234,119 A | * | 11/1980 | Masaoka et al. |
| 4,258,242 A | * | 3/1981 | Fujimori et al. |
| 4,348,131 A | * | 9/1982 | Shimanuki et al. |
| 4,459,062 A | | 7/1984 | Siebert ....................... 403/271 |
| 5,148,966 A | | 9/1992 | Minase et al. .............. 228/149 |
| 5,227,609 A | * | 7/1993 | Simon et al. |
| 5,233,149 A | | 8/1993 | Killian et al. ............. 219/76.12 |
| 5,258,600 A | | 11/1993 | Arthur ......................... 219/137 |
| 5,532,454 A | * | 7/1996 | Kuhnen |
| 5,796,069 A | * | 8/1998 | Jones et al. |
| 6,013,890 A | * | 1/2000 | Hulsizer |
| 6,080,960 A | * | 6/2000 | Fournier et al. |

OTHER PUBLICATIONS

Fairchild, D. P. "Local Brittle Zones in Structural Welds", Annual Meeting of the Metallurgical Society, Inc., Denver, CO (Feb. 22–26, 1987) pp. 303–318.

* cited by examiner

Primary Examiner—Tom Dunn
Assistant Examiner—Kiley Stoner
(74) Attorney, Agent, or Firm—Marcy Hoefling; Frank Reid

(57) ABSTRACT

The invention relates to a method for forming a welded joint between abutting pieces of steel. The welded joint is produced by first forming a strength weld and then depositing additional weld metal on the toe of the strength weld to form a toughness weld. The fusion interface of the toughness weld forms a minimum angle with the direction of the maximum tensile load across the welded joint. The toughness weld toe is separated from the heat-affected zone of the strength weld to effectively prevent propagation of a crack initiated at the toughness weld toe into the heat-affected zone of the strength weld. The welded joint so produced is substantially resistant to failure by brittle fracture.

11 Claims, 6 Drawing Sheets

WELDING PROCESS AND WELDED JOINTS

This application claims the benefit of U.S. Provisional Application No. 60/125,789, filed Mar. 23, 1999.

FIELD OF THE INVENTION

The present invention relates generally to the field of fusion welding. More particularly, but not by way of limitation, the invention pertains to a method for producing welded joints having improved low temperature properties relative to joints produced by conventional welding processes.

BACKGROUND OF THE INVENTION

Frequently in industry there is a need for pressure vessels, piping, and other equipment for processing, storing, or transporting liquids or compressed gases at low temperatures. Such gases include, but are not limited to, hydrogen, helium, nitrogen, oxygen, air, or methane. In particular, it is sometimes desirable to convert a gas into liquid form for storage or transport. Natural gas is typically converted to a liquid at the extremely cold temperature of about −162° C. (−260° F.) and at atmospheric pressure. There is also a need for containers for storing and transporting pressurized liquefied natural gas (PLNG) at pressures in the broad range of about 1725 kPa (250 psia) to about 7590 kPa (1100 psia) and at temperatures higher than about −112° C. (−170° F.). The particular materials of construction and methods of fabrication selected for equipment for such applications depend on the operating conditions to which the equipment will be exposed.

Pressure vessels, piping, and other types of processing and storage equipment are frequently fabricated from steel alloys. As operating pressures increase, such as to 690 kPa absolute (100 psia) or more, and service temperatures decrease, such as to at or below 0° C. (32° F.), it becomes increasingly more difficult to achieve the required strength and fracture toughness properties with steel. Normally, stronger steel alloys are less ductile, are more susceptible to failure by brittle fracture, and are therefore not suited for cold temperature service. Conversely, steel alloys having good fracture toughness properties at lower temperatures typically have lower tensile strength and are thus not suited for high pressure applications. Therefore, as operating temperatures decrease and/or operating pressures increase, the number of steel alloys that will meet the minimum required design criteria for both strength and ductility decreases.

One means of producing the desired combination of high strength and low temperature fracture toughness in steel alloys includes proper selection of the constituent elements of the alloy and performance of particular thermal and mechanical processing steps during production of the steel. Certain combinations of constituents and thermo-mechanical processing steps produce steel alloys having specific microstructures which in turn result in the desired mechanical performance characteristics.

Fabrication of pressure vessels, piping, or other equipment usually requires the use of welded connections between steel plates, pieces of pipe, and/or other components in order to form a continuous metal enclosure. Conventional welding processes produce a heat-affected zone (HAZ) in the base metal near the fusion interface of the weld metal and the base metal. When the base metal is a steel that has been subjected to thermo-mechanical processing or other finishing steps in order to produce a specific microstructure, the heat of welding frequently results in an alteration of the microstructure and a concomitant degradation in mechanical properties. In particular, portions of the HAZ may become particularly susceptible to failure by brittle fracture. A metallurgical term that has been used to refer to small areas of low toughness within the HAZ is "local brittle zone" (LBZ). Any crack in the surface of the base metal near the HAZ will have a tendency to propagate through these embrittled areas in the HAZ since the HAZ typically forms a small angle (i.e. less than 45°) with the plane perpendicular to the direction of maximum tensile load across the welded joint.

In conventional welded joints, the weld toe is defined as the region on the surface of a welded joint at the transition point between the weld metal and the base metal or alternatively as the exposed surface of the fusion interface at the welded joint. For purposes of this specification and the appended claims, a weld toe includes any exposed fusion interface, whether at the weld cap or the root of the weld, including any weld toe that is subsequently covered by another weld. The weld toe is known to be a point of high stress concentration due to both geometrical discontinuity and residual stresses from the thermal cycles of the welding process. This makes the weld toe one of the most likely sites for initiation of a crack in a welded joint. The probability of crack initiation at the weld toe and likely propagation of such a crack through multiple LBZs distributed through the HAZ limit the use of conventional welded joints in cold temperature and/or high pressure service or for welding of steel alloys having heat sensitive microstructures.

U.S. Pat. No. 4,049,186 discloses a method of reducing the probability of stress corrosion cracking in butt-welded joints in austenitic piping in nuclear reactor service. The use of various types of overlay welds on the exterior of a butt-welded joint in piping are disclosed. The purpose of these overlays is to reduce the stress on the sensitized steel at the welded joint on the inner diameter of the pipe where the sensitized steel is exposed to the process fluid. U.S. Pat. No. 5,258,600 discloses a method of connecting mechanically and/or thermally treated alloy piping. The disclosed method improves the tensile strength of the piping connection. Neither of these references addresses failure mechanisms associated with low temperature service.

U.S. Pat. No. 3,745,322 discloses a method of reducing weld bond brittleness in welded joints between high strength steels, low-temperature service steels, or low alloy steels. The method involves deposition of high notch toughness metal layers to the surfaces to be joined and subsequently applying the connecting weld to the deposited high notch toughness metal layers. The heat of application of the connecting weld also serves to heat treat the weld bond between the base metal and each high notch toughness metal layer. This process requires three separate welds for each joint thus increasing welding costs. Furthermore, the resulting HAZ's still form a small angle with the plane perpendicular to the direction of maximum tensile load across the welded joint and are aligned with the discontinuities in the surface which are most likely to initiate cracks.

Accordingly, a need exists for welding methods that reduce the possibility of failure of a welded joint by brittle fracture, in particular by reducing the likelihood of cracks being initiated and propagating through the HAZ at the welded joint. Welded joints produced by such methods would be particularly useful in low temperature service and for welded connections between steel alloys having heat-sensitive microstructures. Preferred methods would also be suited for field applications by minimizing the importance of the orientation of the pieces to be joined and the direction of the weld in three-dimensional space.

SUMMARY OF THE INVENTION

In a preferred embodiment, the present invention relates to a method for welding together abutting pieces of steel. The pieces of steel can be plates, including juxtaposed edges of a single bent plate of steel, sections of pipe, or other formed shapes. Each piece of steel proximate the welded joint has a first surface, a second surface, and a joining surface. The pieces are positioned relative to one another prior to the welding process such that the first surfaces of the pieces of steel are substantially coextensive or aligned with one another, the second surfaces of the pieces of steel are substantially coextensive or aligned with one another, and the joining surfaces form a gap or groove suitable for application of a fusion welding process to join the two pieces of steel. After welding, these coextensive surfaces form, respectively, the first and second surfaces of a newly formed single piece of steel.

In a preferred embodiment of this invention, a strength weld is first formed between the pieces of steel. The strength weld is formed using a first weld metal and a first fusion welding process. The strength weld forms the primary load-bearing portion of the final welded joint of this invention. "Primary load-bearing portion" as used in this context, means the portion that bears at least 80 percent of the load-bearing capacity of the final welded joint. A cross-section of the strength weld normal to the direction of the weld is bounded on its four sides by a first strength weld metal surface, a second strength weld metal surface opposite the first strength weld metal surface, and a first fusion interface at the junction with each piece of steel. The junction of each strength weld metal surface and each first fusion interface defines each of the four strength weld toes.

After completion of the strength weld, one or more toughness welds is formed by using a second fusion welding process to deposit a second weld metal on at least one surface of the newly formed single piece of steel covering the strength weld toes. The second weld metal covers a portion or all of at least one of the strength weld metal surfaces and a portion of the surface of each original piece of steel proximate each strength weld toe. A second fusion interface, bounded by the strength weld toe and a newly formed toughness weld toe, is created between the second weld metal and the covered portion of the surface of each piece of steel. Preferably, joining edge preparation techniques and welding methods are selected consistent with minimizing the angle formed between the direction of maximum tensile load across the welded joint and the plane containing the second fusion interface, in particular that portion of the second fusion interface adjacent the toughness weld toe. The toughness weld toe is also preferably a sufficient distance from the strength weld toe so that it does not coincide with any portion of the strength weld HAZ.

In some embodiments of the invention, the first and second weld metals are the same. In other embodiments, the first and second weld metals are different. In yet other embodiments, the first and second fusion welding processes are the same. In other embodiments, the first and second fusion welding processes are different.

DESCRIPTION OF THE DRAWINGS

The advantages of the various embodiments of the present invention will be better understood by referring to the following detailed description and the attached drawings in which.

While the invention will be described in connection with its preferred embodiments, it will be understood that the invention is not limited thereto. On the contrary, the invention is intended to cover all alternatives, modifications, equivalents, and combinations which may be included within the spirit and scope of the invention, as defined by the appended claims. In particular, the description of these figures should not be construed to limit the invention to connection of plates. The welded connections of the invention can be between steel plates, pieces of pipe, pieces of fabricated metal, or any combination thereof.

DETAILED DESCRIPTION OF THE INVENTION

The present invention is a method for producing welded joints having improved low temperature properties relative to conventional welding procedures. A method is provided for forming a welded joint between abutting pieces of steel, wherein the welded joint is substantially resistant to failure by brittle fracture. Welded joints produced by this method are particularly suited for construction of pressure vessels, piping, and other pressure-containing equipment subjected to low temperatures and high stress during operation. The invention is also useful for producing welded joints between pieces of steel susceptible to alteration of the microstructure and subsequent degradation of mechanical properties due to exposure of the steel to normal welding temperatures.

Preferred steel alloys for application of this invention include those that have been thermo-mechanically processed to produce a microstructure resulting in both high strength and high toughness. Preferred steels have the following characteristics for steel plate thicknesses of about 2.5 cm (1 inch) and greater: (i) DBTT lower than about −73° C. (−100° F.) in the base steel and in the weld HAZ, (ii) tensile strength greater than about 830 MPa (120 ksi), preferably greater than about 860 MPa (125 ksi), and more preferably greater than about 900 MPa (130 ksi), (iii) superior weldability, (iv) substantially uniform through-thickness microstructure and properties, and (v) improved toughness over standard, commercially available, HSLA steels. These steels can have a tensile strength of greater than about 930 MPa (135 ksi), or greater than about 965 MPa (140 ksi), or greater than about 1000 MPa (145 ksi).

Figures 1A, 1B:
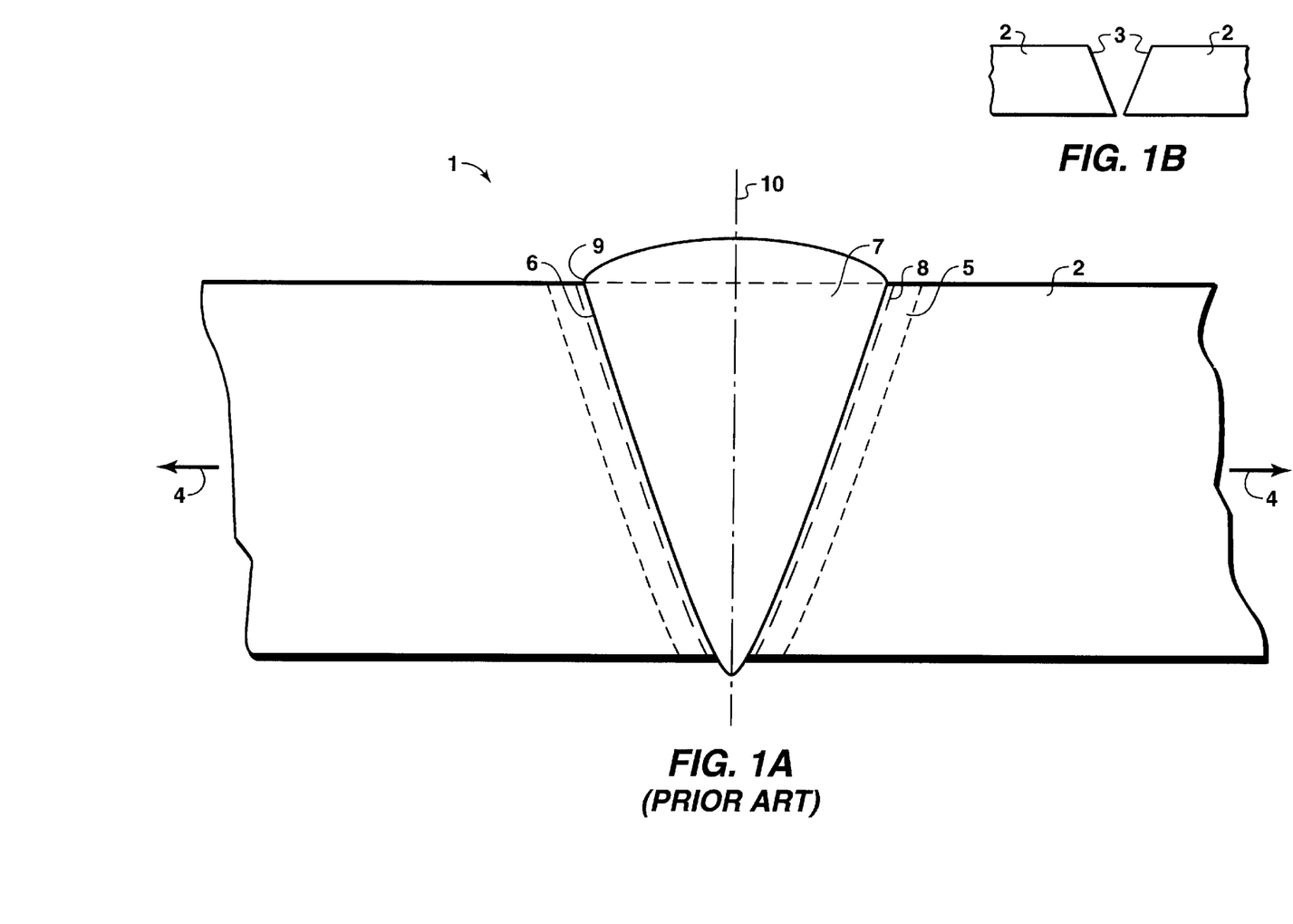
FIG. 1A (Prior Art) illustrates a cross-section view of a conventional single-bevel welded joint, or a single-V groove weld.
FIG. 1B illustrates positioning of the steel plates prior to welding.

A conventional (prior art) single-bevel weld 1, or single-V groove weld, between two steel alloy plates 2 is shown in FIG. 1A. The joining edges 3 (see FIG. 1B) are beveled by methods that are well known to those skilled in the art and that are consistent with deposition of the selected weld metal 7 by the selected fusion welding process into the groove formed by the beveled joining edges 3. After welding, the joining edges 3 substantially define the fusion interface 6 between the weld metal 7 and the steel plates 2. The heat of welding forms a HAZ 5 proximate the fusion interface 6. The HAZ 5 is that portion of the base metal 2 that has not been melted, but in which the microstructure and, accordingly, the mechanical properties have been altered by the heat of welding.

For a single pass weld, the resulting HAZ generally comprises 4 sub-zones. The sub-zone of the HAZ closest to the fusion interface is called the coarse grain HAZ (CGHAZ). In multi-pass welds, each single pass CGHAZ is subjected to repeated heating and cooling creating LBZ's, small areas of low toughness within the HAZ (as defined in the Glossary). Thus for all practical purposes, the resulting composite CGHAZ 8 can be considered the brittle region, or region having the lowest toughness, for metals susceptible to LBZ formation during welding. The formation and characteristics of LBZs are described in detail in D. P. Fairchild, "Welding Metallurgy of Structural Steels", *Proceedings of an International Symposium on Welding Metallurgy of Structural Steels*, The Metallurgical Society, Inc., February 1987, pages 303–318.

Due to the severe thermal history imposed on both the weld metal 7 and the composite CGHAZ 8, the LBZs in the composite CGHAZ 8 are subjected to very high thermal and residual stresses and are, therefore, more susceptible to cracking than other parts of the welded joint. The weld toe 9 is the location that is highly susceptible to initiation of a crack. When a crack is initiated at a weld toe 9, it is automatically positioned in the low toughness CGHAZ; and there is a much higher probability that it will propagate in this region rather than into the higher toughness weld or base metal. Because the LBZs have a lower resistance to cracking than the surrounding base metal in the steel plates 2 or weld metal 7, a crack will likely propagate from one LBZ to another through the composite CGHAZ 8. Since the LBZs are next to the fusion interface 6, the crack will tend to follow the fusion interface 6 unless the plane containing fusion interface 6 proximate the weld toe 9 makes an angle of greater than about 45 degrees with the tensile stress plane 10. The tensile stress plane 10 is defined herein as a plane perpendicular to the direction of the maximum tensile load 4 across the welded joint 1.

In the case where a crack initiates at a weld toe 9 and is initially positioned in the CGHAZ 8, it is more likely to continue to propagate in this region if the steel is a high strength, thermo-mechanically processed (TMCP) steel as compared to lower strength steels. High strength TMCP steels often produce HAZ's that are softer than the unaffected base metal, or the weld metal. Cracks often choose to deviate to, or propagate in, softer material if this material is surrounded by stronger material.

Since LBZs have little cracking resistance, less force is required for the crack to propagate along the fusion interface 6 and cause the welded joint to fail. This description of cracking is applicable to most conventional welds because in most conventional welds, the plane containing fusion interface 6 makes an angle of less than 45 degrees with the tensile stress plane 10. This is particularly true for narrow-groove welds for which the plane containing fusion interface 6 at the weld toe 9 often makes an angle less than 15 degrees with the tensile stress plane 10. Thus a crack in the through-thickness direction, generated at the weld toe 9, has a tendency to follow the fusion interface 6 through the LBZs. The welded joint could fail in this manner by brittle fracture with very little resistance once a crack is initiated.

The usual method to avoid such failure is to design the base metal chemistry and select the welding process to minimize the size and the number of LBZs produced. This remedy may impose significant extra cost and time to the construction project. Conventional welding procedures generally are not conducive to minimizing the density of LBZ's produced to an acceptable level when applied to steel alloys having specific microstructures designed to produce the required balance of high strength and good toughness required for low-temperature, high-stress service conditions.

Figures 2A, 2B:
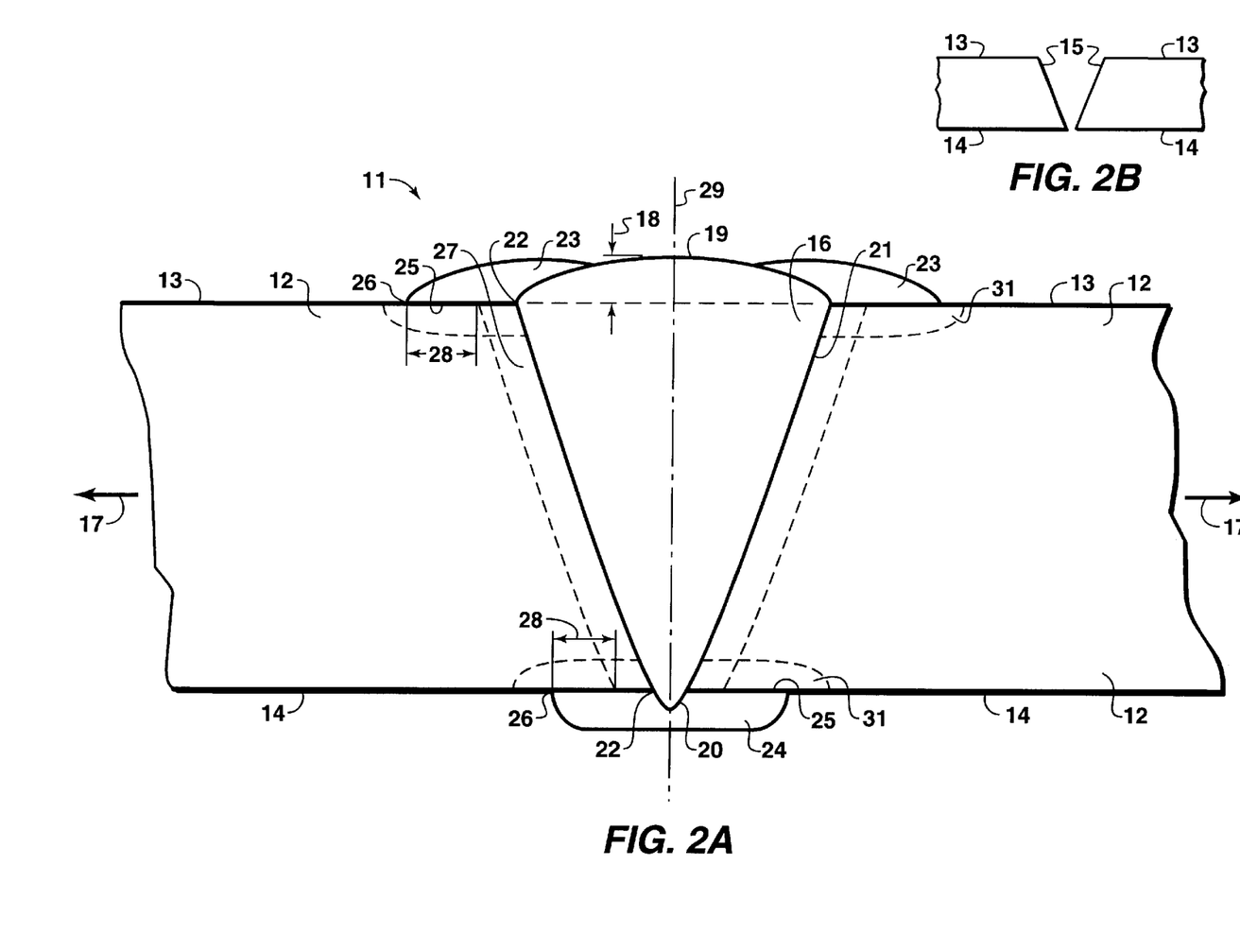
FIGS. 2A and 3A illustrate cross-section views of single-bevel embodiments of welded joint according to this invention and are not drawn to scale.
FIGS. 2B and 3B illustrate positioning of the steel plates prior to welding and are not drawn to scale.

In a preferred embodiment of the present invention, the entire strength weld is deposited from one side of the joint. FIG. 2A illustrates a cross-section view of a single-bevel welded joint, or single-V groove weld, according to this invention. Preferred bevel geometries are dependent on the specific applications and are well known to those skilled in the art. Example weld geometries are referenced in the American Welding Society *Welding Handbook, Volume 2, Welding Processes*, 8th ed., 1995. Welded joint 11 is between two steel alloy plates 12, each having an upper surface 13, a lower surface 14, and a beveled joining surface 15 (see FIG. 2B). The steel plates 12 are positioned relative to one another prior to the welding process as, shown in FIG. 2B, such that the upper surfaces 13 of the steel plates 12 are substantially coextensive with one another, the lower surfaces 14 of the steel plates are substantially coextensive with one another, and the beveled joining surfaces 15 form a groove suitable for deposition of a first weld metal by a first fusion welding process.

A strength weld 16, including a weld cap of height 18 is formed by deposition of a first weld metal by a first fusion welding process into the groove formed by the beveled joining surfaces 15 after positioning the steel alloy plates 12, as shown in FIG. 2B. Referring again to FIG. 2A, strength weld 16 forms the primary load-bearing portion of the final welded joint 11 of this embodiment. Persons skilled in the art may determine the required strength weld cap height 18 based upon the tensile strength of the strength weld metal used to form strength weld 16, the tensile strength of the base metal of the steel plates 12, and the thickness of the steel plates 12. An exemplary calculation method for determining the required strength weld cap height 18 is shown in U.S. Pat. No. 5,258,600. A cross-section of the strength weld 16 is bounded on its four sides by an upper strength weld metal surface 19, a lower strength weld metal surface 20 opposite the upper strength weld metal surface 19, and a first fusion interface 21 at the junction with each steel alloy plate 12. The junction of each strength weld metal surface 19 and 20 and each first fusion interface 21 defines each of the four strength weld toes 22.

After completion of the strength weld 16, toughness welds 23 and 24 are formed by using a second fusion welding process to deposit a second weld metal covering the strength weld toes 22. The second weld metal covers a portion of the surface of the strength weld metal 19 and a portion of the steel plate surfaces 13 and 14 of the steel plate proximate each strength weld toe 22. Second fusion interfaces 25, bounded by the strength weld toes 22 and newly formed toughness weld toes 26, are created between the second weld metal forming toughness welds 23 and 24 and the covered portion of the surface of the piece of steel 12. Each toughness weld toe 26 is a sufficient distance from the strength weld toe 22 such that the toughness weld toes 26 do not coincide with any portion of the strength weld HAZ 27.

Each second fusion interface 25 should cover the portion of the strength weld HAZ 27 exposed on the upper surface 13 or the lower surface 14, along with an additional width 28 on the respective surface of the steel plate 12. This additional width 28 is sufficient to form the toughness weld toe 26 on a portion of the steel plate where the microstructure was not altered by exposure to heat during installation of the strength weld 16. Preferably this additional width 28 is 3 millimeters (mm) or more, even more preferably 5 mm or more. The width of the strength weld HAZ 27 can typically be readily ascertained by one skilled in the art. Alternatively, the width of second fusion interface 25, or distance between the strength weld toe 22 and the toughness weld toe 26, is preferably 8 mm or more, more preferably 10 mm or more. A second fusion interface 25 width of greater than 25 mm would be functional but less preferred due to increasing costs of materials and labor.

Figures 3A, 3B:
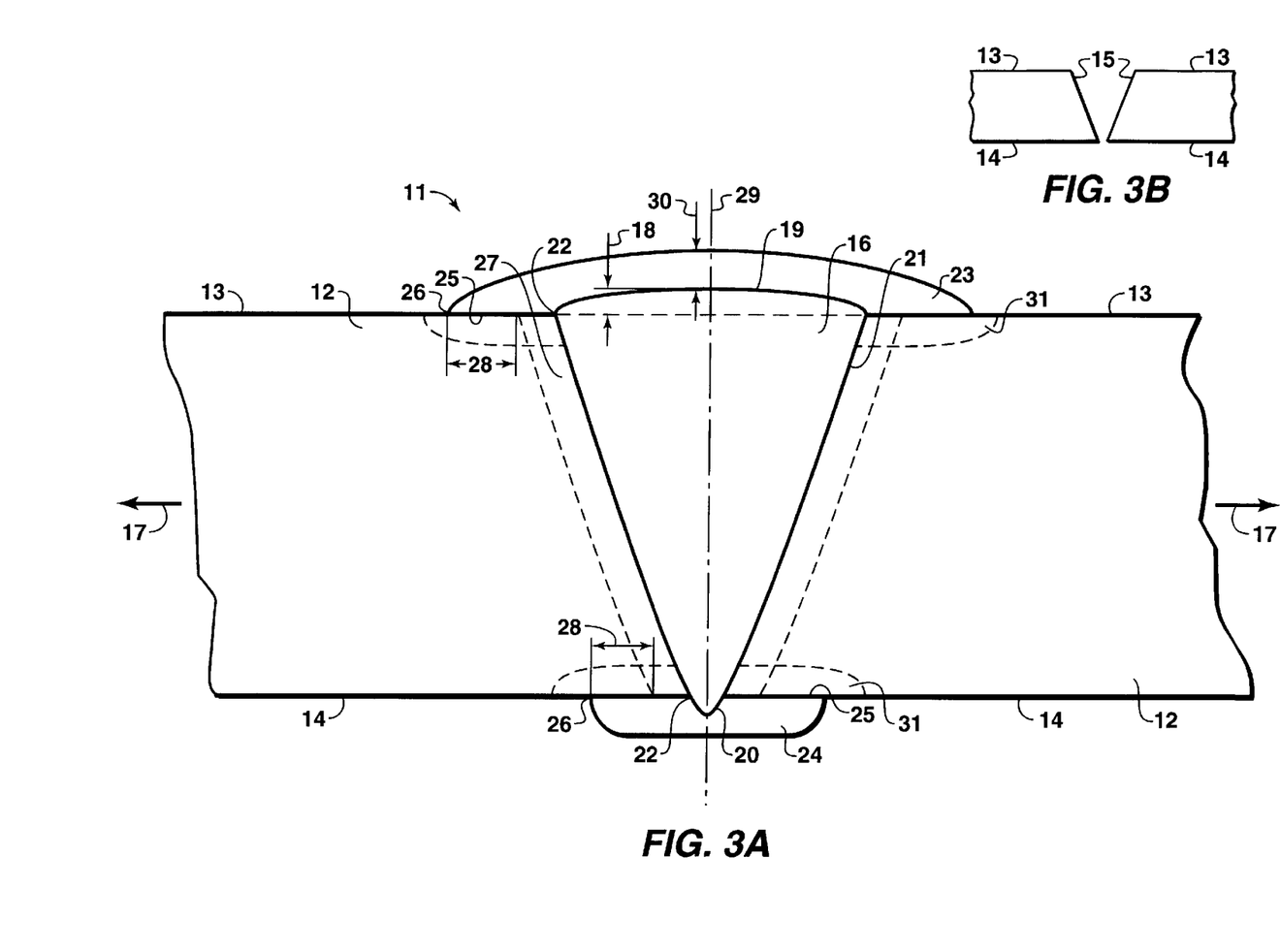

In another preferred embodiment, as shown in FIG. 3A, the strength weld 16 provides the majority but not all of the tensile strength of the final welded joint 11. The toughness weld 23 covers the entire strength weld cap and provides the remaining portion of the required tensile strength of the final welded joint 11 in addition to providing the required second fusion interface 25 as described in the embodiment shown in FIG. 2A. The required toughness weld cap height 30 can be determined based upon a known strength weld cap height 18, the tensile strength of the strength weld metal 16, the tensile strength of the second weld metal forming toughness weld 23, the tensile strength of the base metal of the steel plates 12, and the thickness of the steel plates 12. Given this information, one skilled in the art could adapt the exemplary calculation method shown in U.S. Pat. No. 5,258,600 to calculate the required toughness weld cap height 30. Reference numbers in FIGS. 3A and 3B refer generally to the same features of the welded joint 11 as discussed in the description of FIGS. 2A and 2B, above.

Figures 4A, 4B:
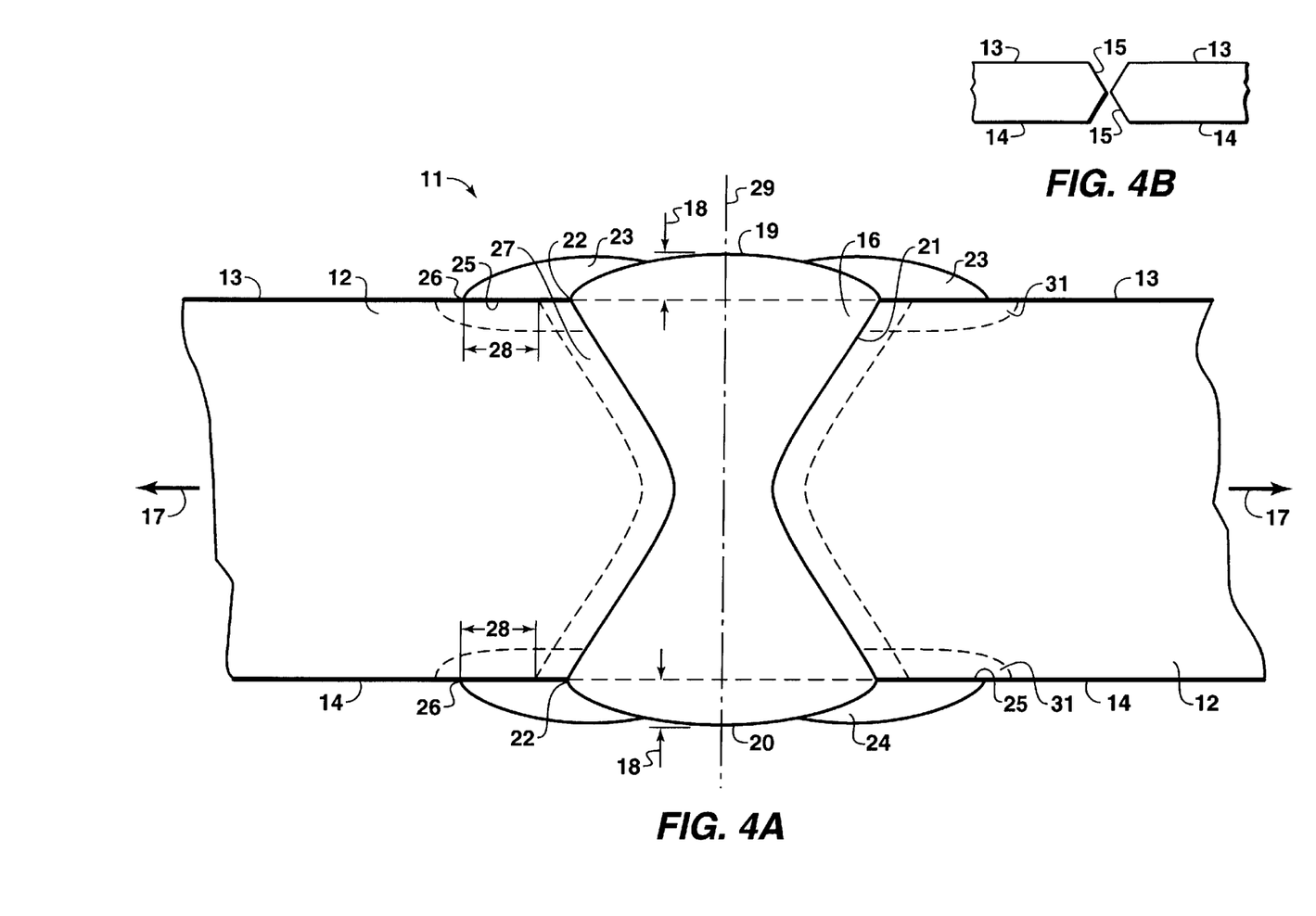
FIGS. 4A and 5A illustrate cross-section views of double-bevel embodiments of welded joints according to this invention, also called double-V groove welds, and are not drawn to scale.
FIGS. 4B and 5B illustrate positioning of the steel plates prior to welding and are not drawn to scale.

In another preferred embodiment, a portion of the strength weld is applied from each side of the joint. FIGS. 4A and 4B show a double-bevel welded joint, or double-V groove weld, according to this invention. Preferred bevel geometries are again dependent on the specific applications and are well known to those skilled in the art. As with the single bevel welded joints, example weld geometries are referenced in the American Welding Society *Welding Handbook, Volume 2, Welding Processes,* 8th ed., 1995. Both the upper and lower surfaces are produced as shown for the upper surface in the description of FIG. 2A, the primary difference being that the sum of the strength weld cap heights 18 in FIG. 4A is calculated such that the two weld caps of strength weld 16 bear substantially the same portion of the maximum tensile load 17 as is borne by the single strength weld cap of strength weld 16 having height 18 as shown in FIG. 2A. Reference numbers in FIGS. 4A and 4B refer to the same features of the welded joint as discussed in the description of FIGS. 2A and 2B, above.

Figures 5A, 5B:
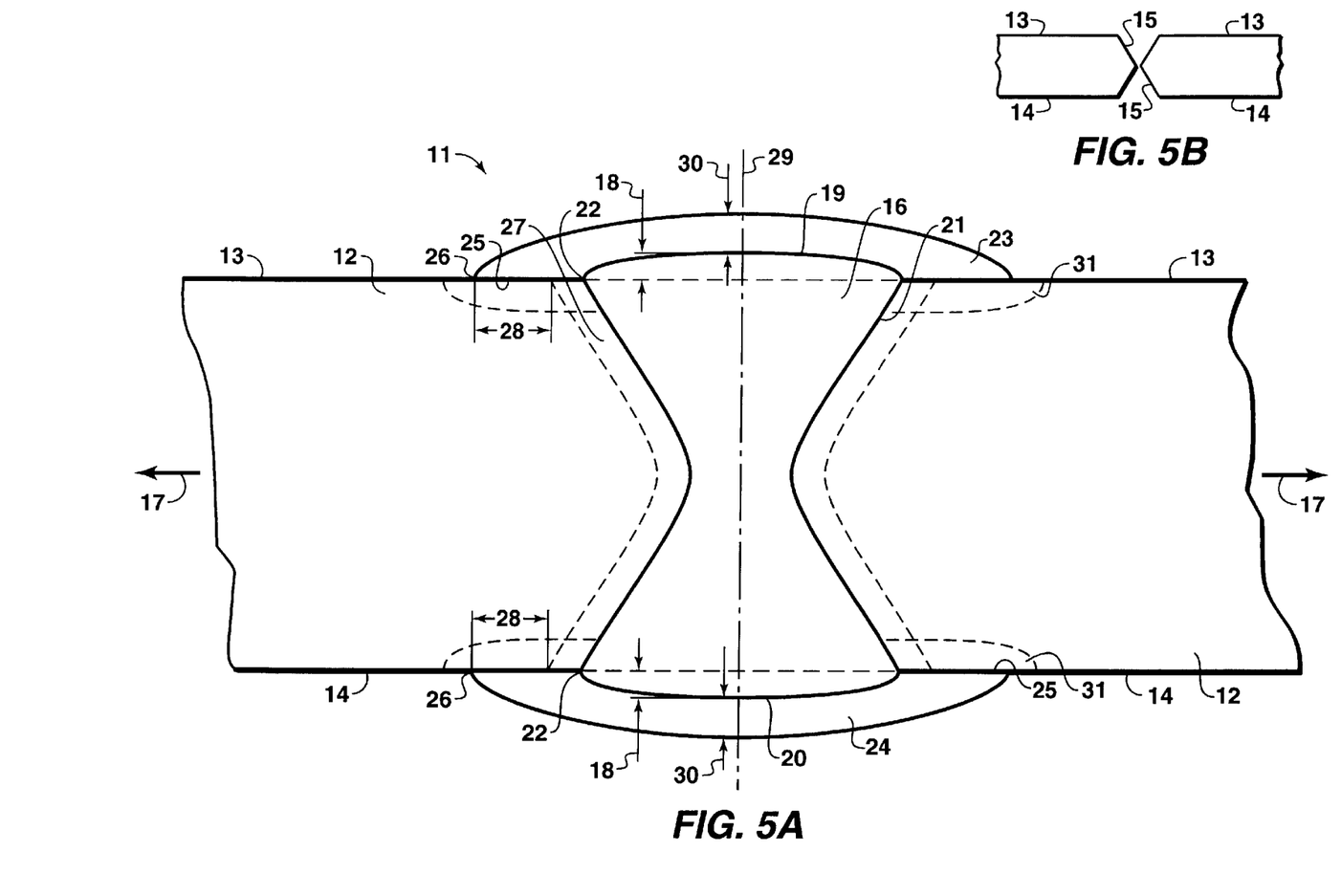

In the embodiment shown in FIG. 5A, the joining surface 15 (shown in FIG. 5B) is again the double-bevel type. In this embodiment, both the upper and lower surfaces are produced as shown for the upper surface in the description of FIG. 3A. The primary difference from the embodiment of FIG. 4A is that in the embodiment shown in Figure 5A, the sum of the strength weld cap heights 18 and the toughness weld cap heights 30 is calculated such that the combination of the weld caps of strength weld 16 and the two toughness welds 23 and 24 bear substantially the same portion of the maximum tensile load 17 as is borne by the two weld caps of strength weld 16 having heights 18 in FIG. 4A. Reference numbers in FIGS. 5A and 5B refer generally to the same features of the welded joint as discussed in the description of FIGS. 2A and 2B.

In all of the embodiments described above, preparation of the upper surfaces 13, lower surfaces 14, and joining surfaces 15 can vary. However, in the final welded joint 11, the smaller of the angles formed by each of the planes containing the second fusion interfaces 25 and the tensile stress plane 29 (plane perpendicular to the direction of maximum tensile load 17 across the welded joint) is greater than about 45 degrees, preferably greater than or equal to about 80 degrees, even more preferably greater than or equal to 85 degrees, and most preferably substantially equal to about 90 degrees. The toughness weld toe 26 is the most likely location in the welded joint 11 for initiation of a crack. The strength weld HAZ 27 is the part of the welded joint 11 most susceptible to propagation of a crack due to alignment of LBZ's. The angle formed by the plane containing second fusion interface 25 and the tensile stress plane 29 and the distance between the strength weld toe 22 and the toughness weld toe 26 separate the region most susceptible to crack initiation from the region most susceptible to crack propagation. Failure of the welded joint 11 by brittle fracture would most likely occur by rapid propagation of a crack from the point of initiation through the plate 12 in a plane parallel to the tensile stress plane 29. Separation of the exposed weld toe, or toughness weld toe 26, from the strength weld HAZ 27 forces a crack formed at the weld toe 26 to propagate through the tougher base metal instead of the LBZ's in the strength weld HAZ 27. Therefore a welded joint 11 produced by the method of this invention is less susceptible to failure by brittle fracture.

In all of the embodiments described above, the first weld metal forming the strength welds 16 and the second weld metal forming the toughness welds 23 and 24 are selected from any suitable welding consumable material having a ferritic or austenitic microstructure. In some embodiments, the first and second weld metals are the same, while in other embodiments, the first and second weld metals are different. Whether the weld metals are the same or different is determined prior to welding and is based primarily upon the metallurgy of the weld metal. In other words, welding metal consumables of different sizes or that are applied by different methods are considered to be the same welding metal for purposes of this invention as long as they each have the same metallurgy prior to application of the selected welding method. Installation costs are typically reduced when the first and second weld metals are the same, while maximum resistance to brittle fracture may be achieved through use of different weld metals for the strength welds 16 and toughness welds 23 and 24.

In all of the embodiments described above, the first fusion welding method forming the strength welds 16 and the second fusion welding method forming the toughness welds 23 and 24 are selected from gas tungsten arc welding, gas metal arc welding, shielded metal arc welding, submerged arc welding, fluxed core arc welding, plasma arc welding, or any of their derivatives. Preferred methods for joining abutting steel plates 12 having particularly heat sensitive microstructures include gas tungsten arc welding, gas metal arc welding (including pulsed gas metal arc welding), and shielded metal arc welding. In some embodiments, the first and second fusion welding methods are the same, while in other embodiments, the first and second fusion welding methods are different. The first and second fusion welding processes can be different in that they are each a different type of welding process (e.g. gas tungsten arc welding and shielded metal arc welding). Alternatively, the first and second fusion welding processes can be different in that they are the same type of welding process (e.g. both gas tungsten arc welding) but are different processes in that the parameters of the welding process are different (e.g. arc current, arc voltage, travel speed, etc.). In one embodiment, the toughness weld metal and the second fusion welding process are selected to produce a lower susceptibility to brittle fracture in said second fusion interface than is present in said first fusion interface. Installation costs are typically reduced when the first and second welding processes are the same, while maximum resistance to brittle fracture may be achieved through use of different welding processes for the strength and toughness welds.

Selection of the best combination of weld metals and welding processes are dependent upon a number of factors. Metallurgy of the base metal to be joined by the welding process, geometry of the welded joint, operating stress and temperature, design service life, cyclic loading, and overall cost are among the factors to be considered in selecting the best combination of weld metals and fusion welding processes for a specific application. Fabrication costs are typically minimized by use of the same weld metal and the same welding process for the strength and toughness welds. Use of different welding processes will usually increase fabrication costs more than use of different weld metals.

Figures 6A, 6B:
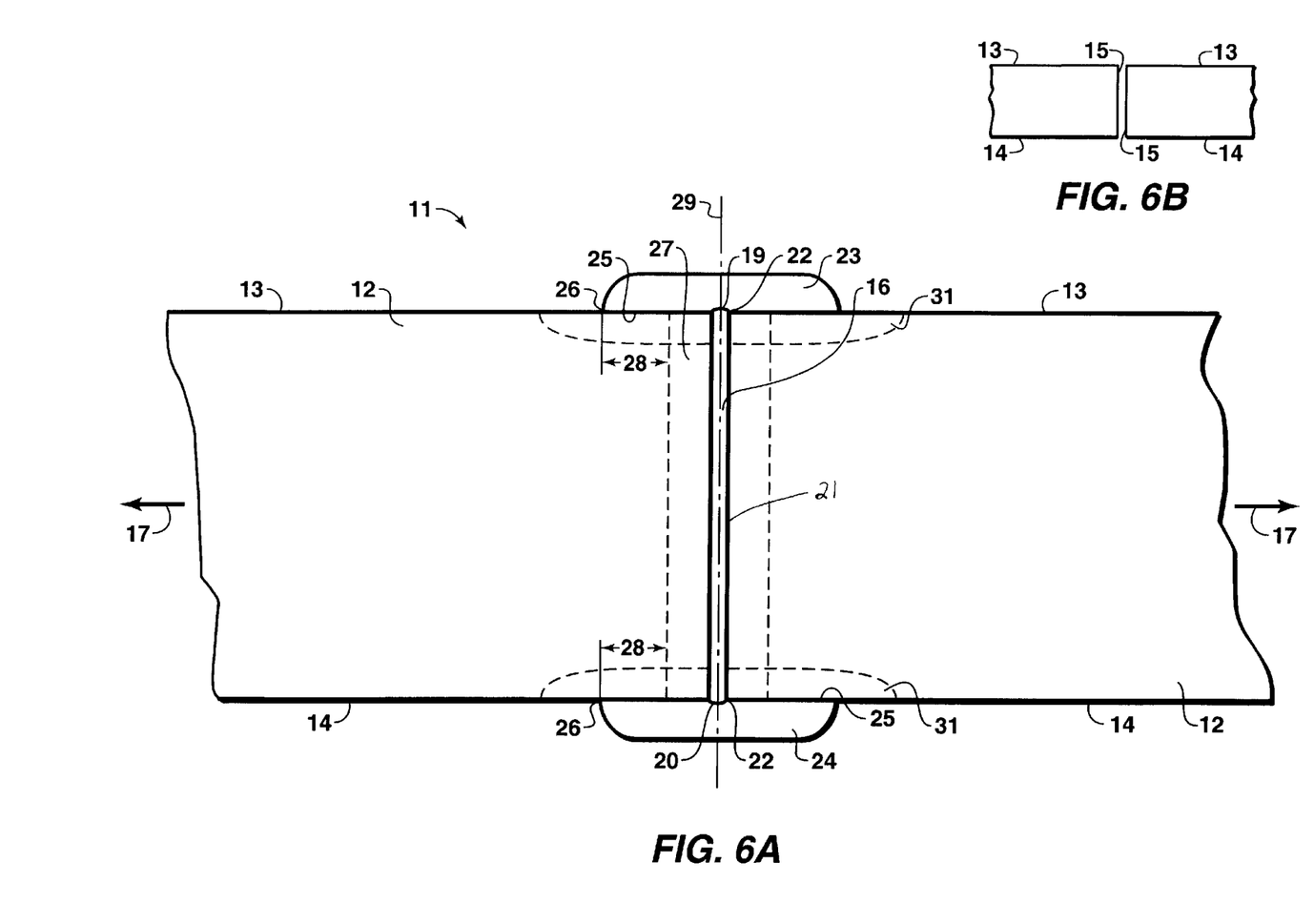
FIG. 6A illustrates a cross-section view of a high energy density welded joint according to this invention and are not drawn to scale.
FIG. 6B illustrates positioning of the steel plates prior to welding and are not drawn to scale.

FIG. 6A shows an embodiment of the invention where the strength weld 16 is formed by a high energy density welding method, such as but not limited to electron beam welding or laser beam welding. These high energy density welding methods are preferred in certain applications where the steel plates 12 are fabricated from a metal having a particularly heat sensitive microstructure. When compared to arc welding the same joint, these beam welding techniques reduce residual welding stresses, reduce HAZ width, reduce mechanical distortion of the joint, and improve HAZ toughness. Electron beam welding is particularly preferred when the thickness of the steel plates 12 is 1 inch (2.54 cm) or more. In this embodiment, the first weld metal will be a portion of the joined steel plates that has been melted and re-solidified or the re-solidified mixture of the steel in the plates 12 and any shim material placed between the joining surfaces 15 prior to welding to alter the properties of the strength weld metal. A weld cap height is not shown since it is insignificant for this method of forming the strength weld 16. In this embodiment, the toughness welds 23 and 24 are formed by a second fusion welding process selected from gas tungsten arc welding, gas metal arc welding, shielded metal arc welding, and submerged arc welding. reference numbers in FIGS. 6A and 6B refer generally to the same features of the welded joint as discussed in the description of FIGS. 2A and 2B, above.

In other preferred embodiments, the lower toughness weld 24 in the embodiments already described in FIGS. 2A, 3A, 4A, 5A, and 6A are omitted. These embodiments are used in cases where there is limited or no access to the lower surfaces 14. This could be the case if in FIGS. 2A, 3A, 4A, 5A, or 6A, each plate 12 was instead a pipe wall and the upper surface 13 was the outside surface of the pipe and lower surface 14 was the inner surface of the pipe.

The methods described above and shown in FIGS. 2A, 2B–6A, 6B are not particularly sensitive to the physical orientation of the joint to be welded. With the exception of the high energy density welding, these welding processes are commonly practiced under field conditions. The primary requirement for these welding methods is that the joint be accessible to the welder and to the required welding equipment.

The final welded joint 11, according to the method of this invention, has at each connection to a piece of steel a composite fusion interface comprising the first fusion interface 21 and the second fusion interface 25. Only the toughness weld toes 26 are exposed on the surface of the newly formed single piece of steel after application of the welding methods of this invention. As the angle increases between the plane containing the second fusion interface 25 and the tensile stress plane 29, the likelihood decreases that a crack initiated at the exposed toughness weld toe 26 will propagate into the toughness weld HAZ 31 created at the second fusion interface 25. When this angle is 90°, the likelihood of such crack propagation is minimized. Use of combinations of a second weld metal and a second fusion welding process that minimize the formation of LBZs in the second HAZ are also preferred. These include but are not limited to selection of second weld metals having lower melting temperatures and second fusion welding processes requiring lower temperatures and/or less exposure time of the steel to be joined to the heat of welding.

Non-limiting variations of the present invention include use of two or more fusion welding processes in a single strength weld, use of two or more fusion welding processes in a single toughness weld, use of two or more weld metals to form a single strength weld, and use of two or more weld metals to form a single toughness weld.

It should be understood by one skilled in the art that earlier descriptions regarding positioning of the two pieces of steel to be joined to create substantially coextensive surfaces includes the production of curved welded joints, welded joints between curved pieces of steel, and welded joints between pieces of steel of different or varying thicknesses. Examples of welded joints where such coextensive surfaces would be created include those required for assembly of a cylindrical or spherical pressure vessel such as, but not limited to, circumferential welds, longitudinal welds, welds required for assembly or connection to hemispherical or elliptical heads, and welds between plates having different thicknesses where thicker materials are required for reinforcement of the vessel.

The method of this invention and welded joints produced by this method would also be applicable to abutting pieces of steel having different shapes, such as but not limited to pipe or nozzle connections to a pressure vessel wall. Benefits of the invention may be derived whenever a welded joint having a strength weld interface forming an angle of less than about 45 degrees with the tensile stress plane is replaced with a welded joint having the composite weld interface of this invention. Such a composite weld interface comprises a strength weld interface forming an angle of less than about 45 degrees and a toughness weld interface forming an angle of greater than about 45 degrees, both with respect to the tensile stress plane. Preferably, the angle between the toughness weld interface and the tensile stress plane is as close to 90 degrees as possible.

EXAMPLE

Co-pending U.S. patent application Ser. No. 09/099,268 now U.S. Pat. No. 6,085,528 and International Publication Number WO 98/59085, entitled "Improved System for Processing, Storing, and Transporting Liquefied Natural Gas" (the "PLNG Patent Application"), describe containers and transportation vessels for storage and marine transportation of pressurized liquefied natural gas (PLNG) at a pressure in the broad range of about 1035 kPa (150 psia) to about 7590 kPa (1100 psia) and at a temperature in the broad range of about −123° C. (−190° F.) to about −62° C. (−80° F.). Co-pending U.S. patent application Ser. No. 09/099,268 now U.S. Pat. No. 6,085,528 is hereby incorporated herein by reference. Containers described in the PLNG Patent Application are constructed from ultra-high strength, low alloy steels containing less than 9 wt % nickel and having tensile strengths greater than 830 MPa (120 ksi) and DBTTs (a measure of toughness, as defined in the Glossary) lower than about −73° C. (−100° F.). Suitable steels for use in constructing the containers are more fully described in the PLNG Patent Application; in co-pending U.S. patent application Ser. No. 09/099,649 now abandoned and International Publication Number WO 99/32672, entitled "ULTRA-HIGH STRENGTH STEELS WITH EXCELLENT CRYOGENIC TEMPERATURE TOUGHNESS"; in co-pending U.S. patent application Ser. No. 09/099,153 now U.S. Pat. No. 6,145,678 and International Publication Number WO 99/32670, entitled "ULTRA-HIGH STRENGTH AUSAGED STEELS WITH EXCELLENT CRYOGENIC TEMPERATURE TOUGHNESS"; in co-pending U.S. patent application Ser. No. 09/099,152 now U.S. Pat. No. 6,066,212 and International Publication Number WO 99/32671, entitled "ULTRA-HIGH STRENGTH DUAL PHASE STEELS WITH EXCELLENT CRYOGENIC TEMPERATURE TOUGHNESS"; in co-pending U.S. patent application Ser. No. 09/215,774 now abandoned and PCT International Application Number PCT/US99/29802, entitled "ULTRA-HIGH STRENGTH STEELS WITH EXCELLENT CRYOGENIC TEMPERATURE TOUGHNESS"; in co-pending U.S. patent application Ser. No. 09/215,773 now U.S. Pat. No. 6,254,698 and PCT International Application Number PCT/US99/30055, entitled "ULTRA-HIGH STRENGTH AUSAGED STEELS WITH EXCELLENT CRYOGENIC TEMPERATURE TOUGHNESS"; and in copending U.S. patent application Ser. No. 09/215,772 now U.S. Pat. No. 6,159,312 and PCT International Application Number PCT/US99/29804, entitled "ULTRA-HIGH STRENGTH TRIPLE PHASE STEELS WITH EXCELLENT CRYOGENIC TEMPERATURE TOUGHNESS" (collectively, the "Steel Patent Applications"). The steels described in the Steel Patent Applications are especially suitable for cryogenic temperature applications in that the steels have the following characteristics for steel plate thicknesses of about 2.5 cm (1 inch) and greater: (i) DBTT lower than about −73° C. (−100° F.) in the base steel and in the weld heat-affected zone (HAZ), (ii) tensile strength greater than about 830 MPa (120 ksi), preferably greater than about 860 MPa (125 ksi), and more preferably greater than about 900 MPa (130 ksi), (iii) superior weldability, (iv) substantially uniform through-thickness microstructure and properties, and (v) improved toughness over standard, commercially available, HSLA steels. These steels can have a tensile strength of greater than about 930 MPa (135 ksi), or greater than about 965 MPa (140 ksi), or greater than about 1000 MPa (145 ksi). Co-pending U.S. patent application Ser. No. 09/099,649, now abandoned Ser. No. 09/099,153, now U.S. Pat. No. 6,251,198 Ser. No. 09/099,152 now U.S. Pat. No. 6,066,212, Ser. No. 09/215,774 now abadoned, Ser. No. 09/215,773 now abandoned, and Ser. No. 09/215,772 now U.S. Pat. No. 6,159,312 are hereby incorporated herein by reference.

The method of this invention and welded joints produced by this method may be used in constructing containers for storing and transporting pressurized liquefied natural gas. In a specific example, without thereby limiting this invention, the method of this invention and welded joints produced by this method may be used to construct such containers using a base steel of the type described in co-pending U.S. patent application Ser. No. 09/099,153 and International Publication Number WO 99/32670, entitled "ULTRA-HIGH STRENGTH AUSAGED STEELS WITH EXCELLENT CRYOGENIC TEMPERATURE TOUGHNESS". For the purpose of this Example, the base steel comprises: about 0.05 wt % carbon, about 1.70 wt % manganese, about 0.075 wt % silicon, about 0.40 wt % chromium, about 0.2 wt % molybdenum, about 2.0 wt % nickel, about 0.05 wt % Nb, about 0.3 wt % copper, and other alloying elements within the ranges described in application Ser. No. 09/215,773, including at a minimum, from about 0.008 wt % to about 0.03 wt % titanium, from about 0.001 wt % to about 0.005 wt % nitrogen, and up to about 0.05 wt % aluminum. Additionally, residuals are preferably substantially minimized in the base steel. Phosphorous (P) content is preferably less than about 0.01 wt %; sulfur (S) content is preferably less than about 0.004 wt %; and oxygen (O) content is preferably less than about 0.002 wt %. A steel slab having this chemistry is prepared to produce an ultra-high strength steel plate having a microstructure comprising a predominantly micro-laminate microstructure comprising fine-grained lath martensite, fine-grained lower bainite, or mixtures thereof, and up to about 10 vol % retained austenite film layers. In somewhat greater detail, the base steel for this Example is prepared by forming a slab of the desired composition as described in this Example; heating the slab to a temperature of from about 955° C. to about 1100° C. (1750° F.–2012° F.); hot rolling the slab to form steel plate in one or more passes providing about 30 percent to about 70 percent reduction in a first temperature range in which austenite recrystallizes, i.e., above about the the temperature, and further hot rolling the steel plate in one or more passes providing about 40 percent to about 80 percent reduction in a second temperature range below about the $T_{nr}$ temperature and above about the $Ar_3$ transformation temperature. The hot rolled steel plate is then quenched at a cooling rate of at least about 10° C. per second (18° F./sec) to a suitable Quench Stop Temperature (QST) preferably below about 550° C. (1022° F.), at which time the quenching is terminated. (See Glossary for definitions of $T_{nr}$ temperature, and of $Ar_3$ transformation temperature.)

The foregoing invention has been described in terms of a number of preferred embodiments. However, it should be understood that other modifications or combinations of portions or aspects of the above described embodiments may be made or derived without departing from the scope of the invention, which is set forth in the following claims. These variations include but are not limited to use of beveling and joining-edge preparation techniques other than those pictured in FIGS. 2A, 2B–6A, 6B. Such variations in preparation techniques may include staged beveling wherein a first portion of the beveled joining surface will be the surface upon which the strength weld interface will be formed and a second portion of the beveled joining surface will be the surface upon which the toughness weld interface will be formed.

GLOSSARY abutting:
    near or close to, not necessarily touching;
$Ar_3$ transformation temperature:
    the temperature at which austenite begins to transform to ferrite during cooling;
CGHAZ:
    sub-zone of the HAZ closest to the fusion interface;
cryogenic temperature:
    any temperature lower than about −40° C. (−40° F.);

DBTT (Ductile to Brittle Transition Temperature):
  delineates the two fracture regimes in structural steels; below the DBTT, failure tends to occur by low energy cleavage fracture, while above the DBTT, failure tends to occur by high energy ductile fracture;
HAZ:
  heat-affected zone;
kPa:
  thousands of pascals;
ksi:
  thousands of pounds per square inch;
LBZ:
  "local brittle zone" —area of low toughness within the HAZ;
MPa:
  millions of pascals;
primary load—bearing portion:
  in relation to a welded joint, means the portion that bears at least 80 percent of the load-bearing capacity of the welded joint;
quenching:
  as used in describing the present invention, accelerated cooling by any means whereby a fluid selected for its tendency to increase the cooling rate of the steel is utilized, as opposed to air cooling;
Quench Stop Temperature (QST):
  the highest, or substantially the highest, temperature reached at the surface of the plate, after quenching is stopped, because of heat transmitted from the mid-thickness of the plate;
tensile stress plane:
  a plane perpendicular to the direction of maximum tensile load across a welded joint;
TMCP:
  thermo-mechanical controlled rolling processing;
$T_{nr}$ temperature:
  the temperature below which austenite does not recrystallize;
weld metal:
  that portion of a weldment that was rendered molten during the welding operation; this volume of material is a mixture of the base metal and the welding consumables;
weldment:
  A welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that was welded, the number of weldments required to fabricate the item, and the distance between weldments; and
weld toe:
  any exposed fusion interface, whether at the weld cap or the root of the weld, including any weld toe that is subsequently covered by another weld.

What is claimed is:

1. A method for creating in a welded joint between two pieces of steel a separation between a heat-affected zone and a toughness weld toe such that a crack formed substantially at said toughness weld toe propagates through one of said pieces of steel instead of through said heat-affected zone, said method comprising the steps of:

a) forming a strength weld between said pieces of steel by joining said pieces of steel using a first fusion welding process and a first weld metal, thereby creating a first fusion interface between said first weld metal and each of said pieces of steel; and b) forming a toughness weld by depositing on said strength weld a second weld metal using a second fusion welding process, said toughness weld covering a toe of said strength weld at the junction of said first weld metal with one of said pieces of steel, said toughness weld creating a second fusion interface between said second weld metal and said one of said pieces of steel, wherein said second fusion interface,
      i) has a width between said covered strength weld toe and said toughness weld toe sufficient to cover at least the width of the heat-affected zone on the surface of said one of said pieces of steel created by formation of the strength weld, and
      ii) forms an angle of greater than about 45 degrees and less than or equal to about 90 degrees with a plane perpendicular to the direction of maximum tensile load across said welded joint.

2. The method of claim 1 wherein said pieces of steel are plates.

3. The method of claim 1 wherein said pieces of steel are piping.

4. The method of claim 1 wherein said first and second fusion welding processes are selected from the group consisting of gas tungsten arc welding, gas metal arc welding, shielded metal arc welding, submerged arc welding, fluxed core arc welding, and plasma arc welding.

5. The method of claim 4 wherein the first fusion welding process and the second fusion welding process are different.

6. The method of claim 4 wherein said first fusion welding process and said second fusion welding process are the same.

7. The method of claimed 6 wherein said first fusion welding process is gas metal arc welding and said second fusion welding process is gas metal arc welding.

8. The method of claim 1 wherein said first weld metal and said second weld metal are selected from the group consisting of ferritic and austenitic welding consumables.

9. The method of claim 8 wherein said first weld metal and said second weld metal are the same.

10. The method of claim 1 wherein the width of said second fusion interface between said strength weld toe and said toughness weld toe is 8 mm or more.

11. The method of claim 1 wherein the width of said second fusion interface is at least the width of said strength weld heat-affected zone plus an additional 3 mm.

* * * * *